(12) United States Patent
Sandstrom

(10) Patent No.: US 8,619,769 B2
(45) Date of Patent: Dec. 31, 2013

(54) PACKET-LAYER TRANSPARENT PACKET-SWITCHING NETWORK

(76) Inventor: Mark Henrik Sandstrom, Calgary (CA)

( * ) Notice: Subject to any disclaimer, the term of this patent is extended or adjusted under 35 U.S.C. 154(b) by 1103 days.

(21) Appl. No.: 12/390,387

(22) Filed: Feb. 20, 2009

(65) Prior Publication Data

US 2009/0310610 A1 Dec. 17, 2009

Related U.S. Application Data

(60) Provisional application No. 61/060,905, filed on Jun. 12, 2008, provisional application No. 61/075,108, filed on Jun. 24, 2008.

(51) Int. Cl.
*H04L 12/28* (2006.01)

(52) U.S. Cl.
USPC .... 370/389; 370/390; 370/395.1; 370/395.51

(58) Field of Classification Search
USPC .............. 370/389–392, 395.1, 395.5, 395.51
See application file for complete search history.

(56) References Cited

U.S. PATENT DOCUMENTS

| | | | |
|---|---|---|---|
| 5,526,349 A | 6/1996 | Diaz et al. | |
| 6,097,733 A | 8/2000 | Basu et al. | |
| 6,574,222 B1 | 6/2003 | Medhat et al. | |
| 7,193,968 B1 | 3/2007 | Kapoor et al. | |
| 7,254,138 B2 | 8/2007 | Sandstrom | |
| 7,333,511 B2 | 2/2008 | Sandstrom | |
| 7,349,414 B2 | 3/2008 | Sandstrom | |
| 7,590,753 B2 | 9/2009 | Wolde et al. | |
| 2003/0147411 A1 | 8/2003 | Goosman | |
| 2004/0032856 A1 | 2/2004 | Sandstrom | |
| 2004/0042495 A1 | 3/2004 | Sandstrom | |
| 2006/0164975 A1* | 7/2006 | Filsfils et al. | 370/225 |
| 2006/0198368 A1* | 9/2006 | Guichard et al. | 370/389 |
| 2008/0069007 A1* | 3/2008 | Vasseur et al. | 370/254 |
| 2008/0123650 A1* | 5/2008 | Bhaskar | 370/392 |
| 2008/0137674 A1 | 6/2008 | Sandstrom | |
| 2009/0196503 A1* | 8/2009 | Sullender | 382/180 |
| 2010/0216392 A1* | 8/2010 | Barkley et al. | 455/3.03 |

OTHER PUBLICATIONS

U.S. Appl. No. 11/692,925, filed Mar. 29, 2007.
U.S. Appl. No. 12/363,667, filed Jan. 30, 2009.
PCT International Search Report and Written Opinion, PCT Application No. PCT/US09/43507, Jul. 14, 2009, 9 pages.
PCT International Search Report and Written Opinion, PCT Application No. PCT/US2009/043506, Oct. 26, 2009, 8 pages.

* cited by examiner

*Primary Examiner* — Brandon Renner

(57) ABSTRACT

Packet forwarding systems and methods allow packet-layer transparent, multi-stage packet forwarding among a set of network access points. Packet forwarding across networks utilizing the invention is directly controllable through the upper-layer nodes, e.g. routers, interconnected by such transparent packet forwarding networks. The systems and methods provide packet-layer routing, switching and forwarding look-up-table free and transparent forwarding of label-encapsulated multi-protocol packet traffic among a set of routers. The invention enables flexible and efficient packet multicast and anycast capabilities along with real-time dynamic load balancing and fast packet-level traffic protection rerouting. The invention replaces the need for packet forwarding look-up-tables in a router interconnect network by a set of rules using which such network forwards packets directly based on their forwarding labels inserted in the packet headers by the routers exchanging packets through said network, thus simplifying network management and equipment implementation, and facilitating optimization of packet traffic flow across communications networks.

27 Claims, 8 Drawing Sheets

PACKET-LAYER TRANSPARENT PACKET-SWITCHING NETWORK

CROSS REFERENCE TO RELATED APPLICATIONS

This application claims the benefit of the following U.S. Provisional Application, which is incorporated by reference in its entirety:

[1] U.S. Provisional Application No. 61/060,905, filed Jun. 12, 2008; and
[7] U.S. Provisional Application No. 61/075,108, filed Jun. 24, 2008.

This application is also related to the following, each of which is incorporated by reference in its entirety:

[2] U.S. Utility Pat. No. 7,254,138, filed Jul. 11, 2002;
[3] U.S. Provisional Application No. 60/869,326, filed Dec. 9, 2006;
[4] U.S. Provisional Application No. 60/894,426, filed Mar. 12, 2007;
[5] U.S. utility application Ser. No. 11/692,925, filed Mar. 29, 2007; and
[6] U.S. utility application Ser. No. 12/363,667, filed Jan. 30, 2009.

BACKGROUND

The invention pertains to the field of communications network systems, in particular to packet-switching networks providing packet-layer transparent packet-switched connectivity.

For convenience of the reader, brief definitions for certain acronyms used in this specification are provided below:

| | |
|---|---|
| ABI | AMB IF unit |
| AIS | Alarm Indication Signal |
| AMB | Adaptive Concatenation Multiplexer Bus |
| A-M | Adaptive-Mesh, a packet-layer transparent packet-forwarding network |
| FE | Forwarding Engine |
| FEV | Forwarding Enable (Bit) Vector |
| FIFO | First-In-First-Out buffer |
| FIT | Forwarding Instruction Tag |
| HDLC | High Level Data Link Control protocol, IETF RFC 1619/1662 |
| IF | Interface |
| L1 | Layer 1 i.e. physical layer of ISO OSI network protocol stack |
| L2 | Layer 2 i e link layer of ISO OSI network protocol stack |
| L3 | Layer 3 i.e. network layer of ISO OSI network protocol stack |
| LSB | Least Significant Bit |
| MPLS | Multi-protocol Label Switching, see IETF RFC 3032 |
| MSB | Most Significant Bit |
| NE | Network Element; a node in an network |
| NMS | Network Management System |
| POS | Packet-Over-SDH/SONET, IETF RFC 2615 |
| PPP | Point-to-Point Protocol, IETF RFCs 1661, 1619, 1662 |
| QoS | Quality of Service |
| SDH | Synchronous Digital Hierarchy, ITU-T Recommendations G.707, G.783 |
| SONET | A subset of SDH standardized in North America |

Conventional packet-switching networks are not packet-layer transparent, and furthermore require packet-layer routing, switching or forwarding look-up tables for their forwarding engines to resolve how to forward each packet. Theses aspects of conventional packet-switching networks make inter-domain administration of packet-switching networks complex, expensive and vulnerable to security breaches. Moreover, the packet-switching hardware logic becomes complicated when having to do packet-switching among multiple network domains, limiting the cost-efficiency and scalability of packet-switching networks.

These factors create a need for innovation enabling packet-layer transparent packet forwarding networks that do not need routing, switching or forwarding tables.

SUMMARY

Embodiments of the invention enable a data packet delivery network capable of providing packet-layer transparent packet forwarding among a set of upper-layer nodes, referred to as routers, based directly on the packet forwarding instruction tags (FITs) assigned to the packets by the routers sending packets to each others through said network, i.e., without a need for any packet-layer routing, switching or forwarding look-up tables at the network utilizing the inventions.

Embodiments of the invented network system enable the routers to establish among themselves a mesh of direct L2 links, while supporting multiple L2 links on the L1 connections between each router and said network system, thus allowing the routers to exchange packets with each others over the invented network system through even just a single L1 connection per a router. The network system enables the routers connected to it to interact with each others in direct full mesh manner fully transparently at all packet level protocol layers, i.e. at L2 and higher. The invented network system thus is able to provide direct L1 full mesh like, deterministic and high quality, packet-layer transparent and secure network connectivity among the routers it interconnects, without requiring a mesh of L1 connections between said routers.

Embodiments of the invention provide systems and methods for packet-layer transparent packet forwarding over multiple forwarding stages through a network between routers interconnected through said network. Routers connected by a network based on the invented transparent packet forwarding mechanism see each others directly at packet layer protocol levels, and are thus able to carry out all their packet-layer protocol transactions directly among themselves, without having to interact with said interconnect network.

Per an embodiment of the invention, for each stage of packet forwarding, the previous stage indicates via specific bit fields, referred to as Active FIT Identifiers (ATIs), which one of the stack of FITs in the packet header the following stage, if any, is to use. The routers send packets to the network per the invention with a stack of FITs in their header, with one FIT per each stage of forwarding within the network, and with the top-most FIT marked as active. Successive forwarding stages in the network apply the FITs marked as active for them, and modify the ATIs to activate the subsequent FIT for the next stage, except that the final stage reverts the ATIs to the original values in which they were when any given packet was first received by such network. The transparent, forwarding look-up-table free network system per the invention interprets these packet FITs according to a known set of rules, causing the appropriate next-hop routers to receive the packets without any modification to their contents.

Accordingly, the invention replaces the need for costly and complicated packet-layer routing, switching and forwarding tables in a router interconnect network by a set of pre-determined rules using which the invented network forwards packets directly based on their FITs inserted in packet headers by the routers exchanging packets through said network.

Figure 1:
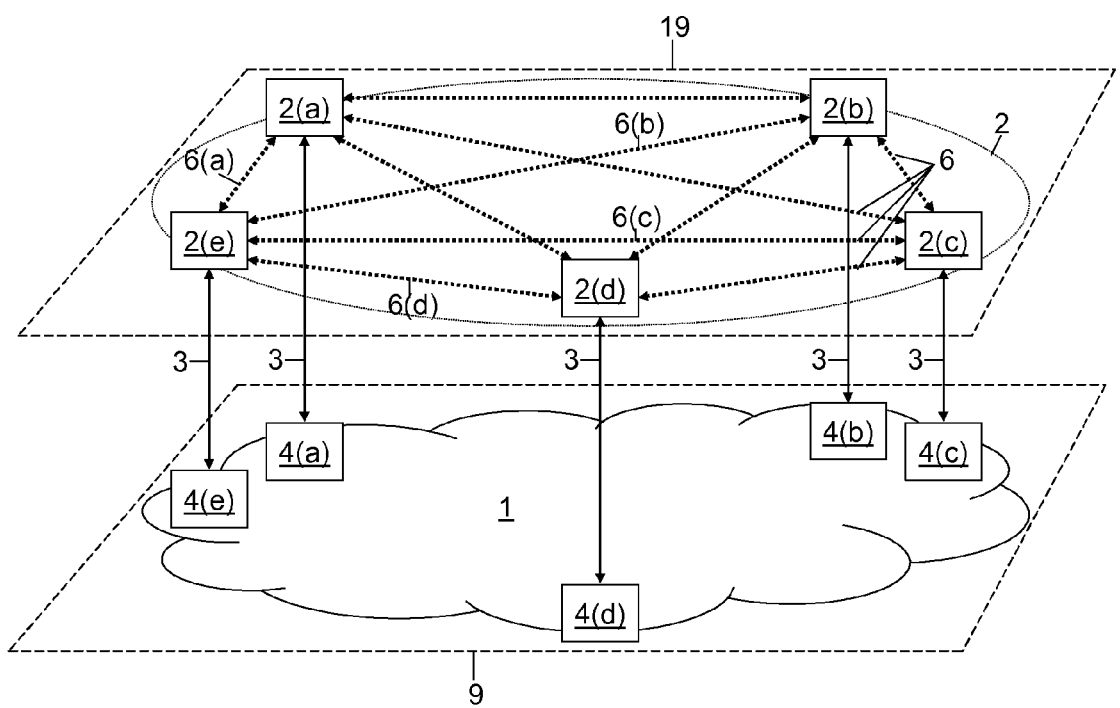
FIG. 1 presents an example of an embodiment of a transparent network domain employing the packet forwarding method of the present invention, in an application of delivering data packets among a set of packet-switching upper-layer nodes, e.g. IP/MPLS routers.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention is described herein first by illustrating the novel concepts via a more detailed discussion of the drawings, and then by providing specifications for a reference embodiment of the invention.

Symbols and notations used in the drawings:

Solid arrows indicate a communications signal i.e. data traffic flow. Dotted arrows between network elements (drawn as boxes) indicate direct i.e. transparent connectivity at the packet-layer. Gapped arrows indicate a route of a traffic flow across network.

Boxes represent network elements, such as a packet-switch nodes.

Cloud shapes, such as the one below the packet-switches 2 in FIG. 1, present an abstraction of a physical network interconnecting the nodes (4 in FIG. 1) on its edges.

Figure 8:
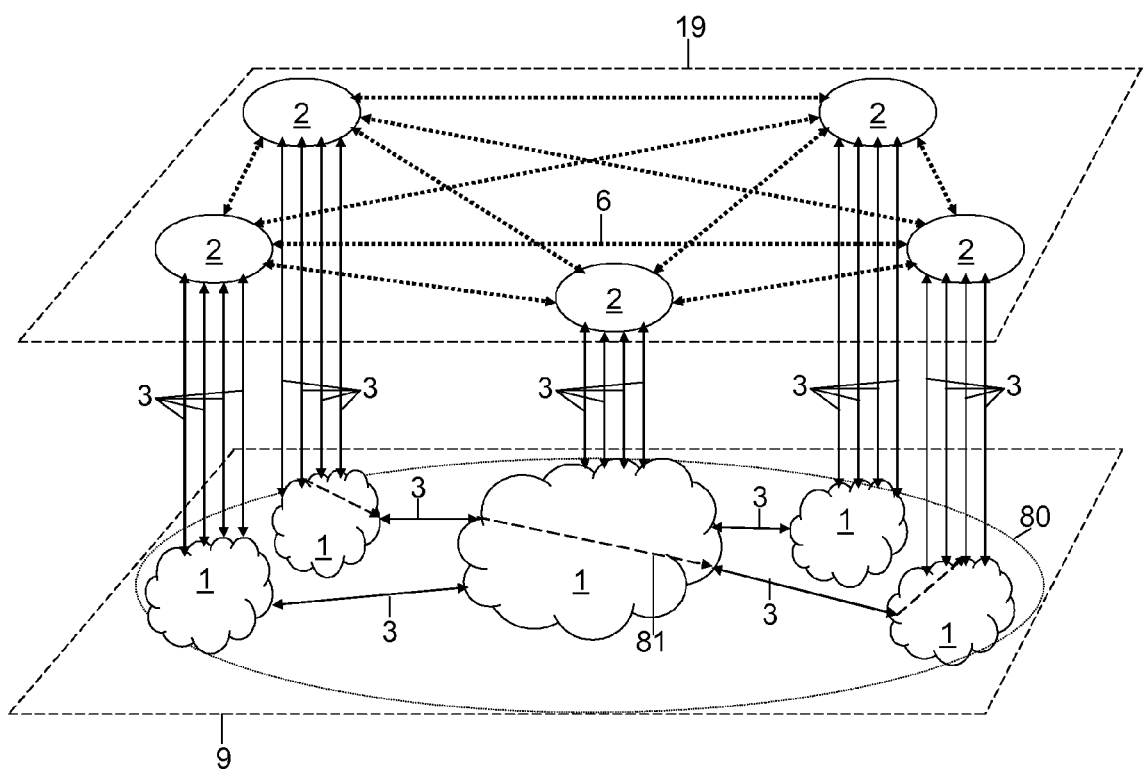
FIG. 8 presents an embodiment of a cluster of transparent network domains, each utilizing the forwarding method of the present invention.

Circular, dotted-line, shapes mark a border of a group of drawn elements that form a logical entity, such as the set 2 of packet-switching nodes, elements 2(a) through 2(e), on the upper network layer 19, in FIG. 1, or the cluster 80 of network systems 1 in FIG. 8.

Figure 3:
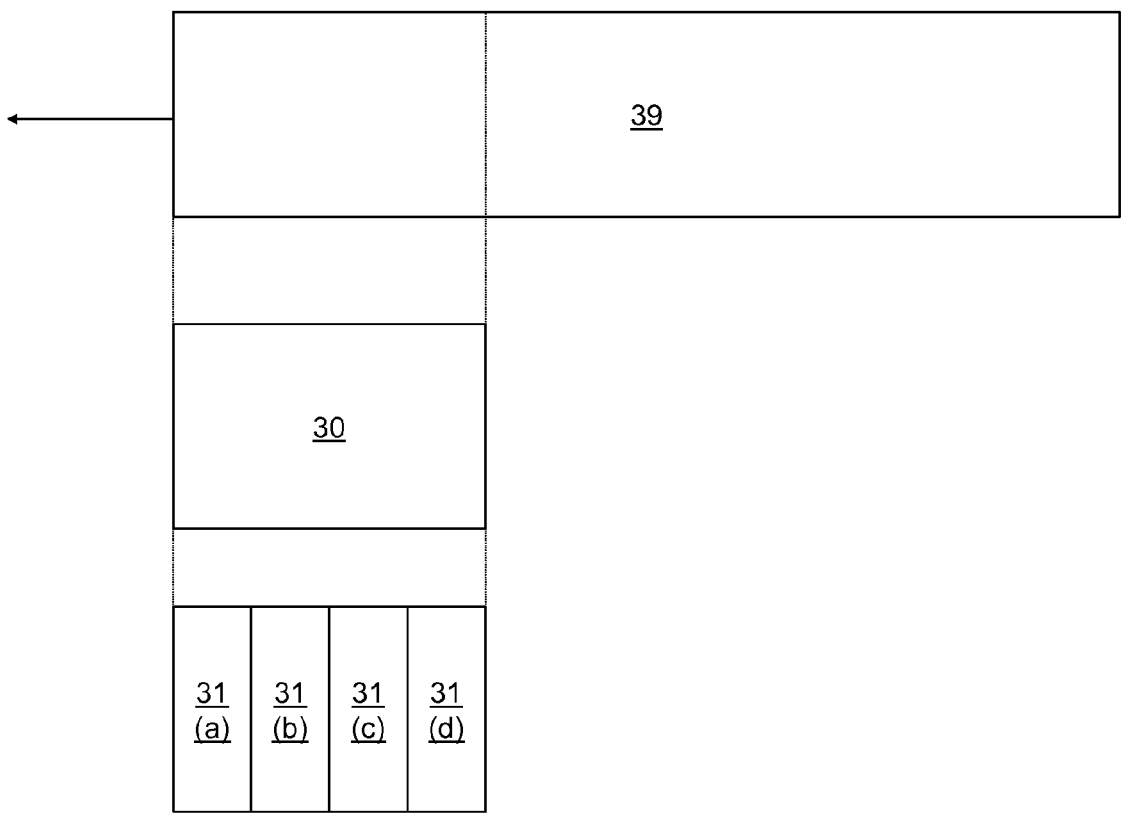
FIG. 3 presents an embodiment of a simple forwarding instruction field, referred to herein as Forwarding Instruction Tag (FIT) of a data packet; a bit vector within the packet header wherein each bit indicates whether the network domain should deliver the packet to its corresponding remote router, with that bit vector referred to herein as Forwarding Enable Vector (FEV).
Figure 4:
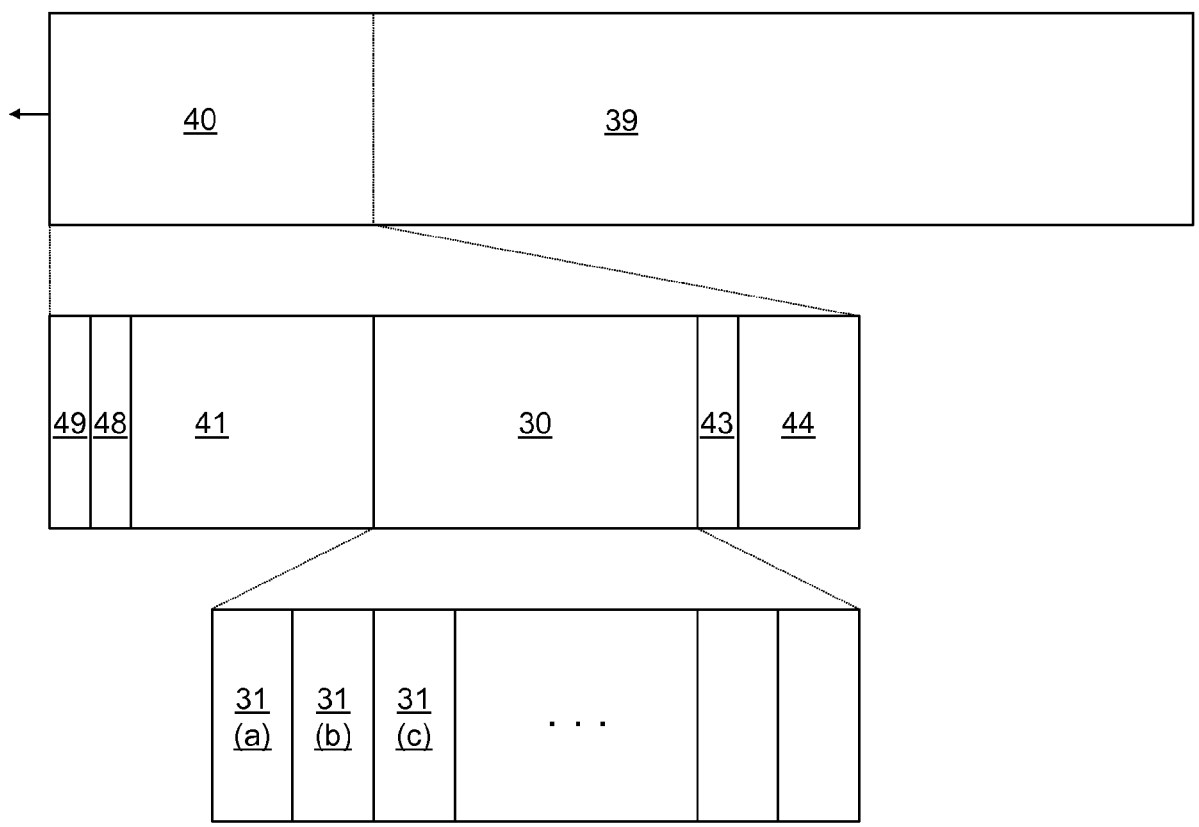
FIG. 4 presents an embodiment of an augmented forwarding instruction format, including an active FIT entry identifier, a FIT concatenation identifier, plus primary and alternative next-hop destination fields, in addition to the FEV.

In FIGS. 3 and 4, the boxes, such as 39 and 30, indicate data packets or portions thereof i.e. bit fields of data packets. The (semi-)vertical dotted lines between the boxes indicate that a portion of a data packet delimited by the dotted lines is presented below with a greater internal detail (in a magnified scale).

Lines or arrows crossing in the drawings are decoupled unless otherwise marked.

FIG. 1 presents, in accordance with an embodiment of the invention, a network system 1 in an application where it is used to deliver data packets among a set 2 of routers, 2(a) through 2(e), called herein as routers. Note though that nodes 2 do not however need to do L3 routing; for the purposes discussed herein it is sufficient that the nodes 2 do packet-level switching, and they can in practice be e.g. MPLS switches. The routers delimit the network system 1 as a single administrative domain, within which a domain-internal node addressing scheme can be used for delivering data packets among the routers 2. Although FIG. 1 presents only five such routers, the network system 1 can be used to deliver packets among virtually any number of routers. The upper plane 19 on which the routers are drawn on, symbolizes a packet-switching network layer, such as L3 in the OSI model of ISO. The lower plane 9 is the network protocol layer below that of the plane 19 in the layered network model, and it is intended to provide transparent delivery of data packets among the routers 2. Due to such intended upper-layer-protocol transparency of the lower network layer 9, the upper-layer 19 nodes 2, when interconnected by a transparent interconnect network 1, see each others as next-hop destinations i.e. direct neighbors to each other.

The routers 2 interface with each other using 1 connections 3. Such L1 connections or network interfaces 3 are normally two-directional, comprising a network ingress port, for passing traffic from an upper layer 19 node 2 to the interconnect network 1, and a network egress port, for passing traffic from the interconnect network to a router 2. In a conventional network a router would need a dedicated L1 9 connection 3 to each upper layer 19 node to which it needs a direct i.e. packet-layer transparent connection 6. With a L1 network system utilizing the packet-layer-transparent packet forwarding method of the present invention, however, the set 2 of routers can interface with each other over transparent full-mesh 6 with using only a single L1 connection 3 per a router. (Even though only the those of the full-mesh connections that terminate at the router 2(c) are pointed by the reference character 6, it should be understood that each the dotted arrow terminating at any of the routers 2 are part of the full-mesh.)

It needs to be noted that while the network system 1, due to its innovative packet forwarding method, thus reduces the count of L1 connections required to achieve direct, transparent full-mesh connectivity among the routers 2 by a factor directly proportional to the number of meshed routers, and thereby substantially simplifies the network implementation and management, the network system 1 also provides deterministic QoS for the traffic flows 6 between each of the set of routers 2. Thus, for instance in an application of interconnecting a set 2 of routers, the network system 1 is able to provide deterministic QoS without having to use a mesh of L1 connections, between said set of routers. Note further that when the network system 1 uses the embedded control plane and dynamic data plane principles disclosed in the referenced utility application [4], the network system 1 is able to provide at the same time both guaranteed minimum L1 bandwidth availability as well as ability to utilize all the available bandwidth for connections between the set 2 of upper-layer 19 nodes, which capabilities generally cannot be provided by conventional packet-switching and forwarding techniques.

A practical application example for a network architecture of FIG. 1 is a backbone network of a communications service provider, wherein the routers 2 of the service provider, located on the edges of the network 1, e.g. at POPs in different cities, exchange traffic mutually over the network system 1, which operates as a fast inter-POP Internet backbone for the service provider.

Figure 2:
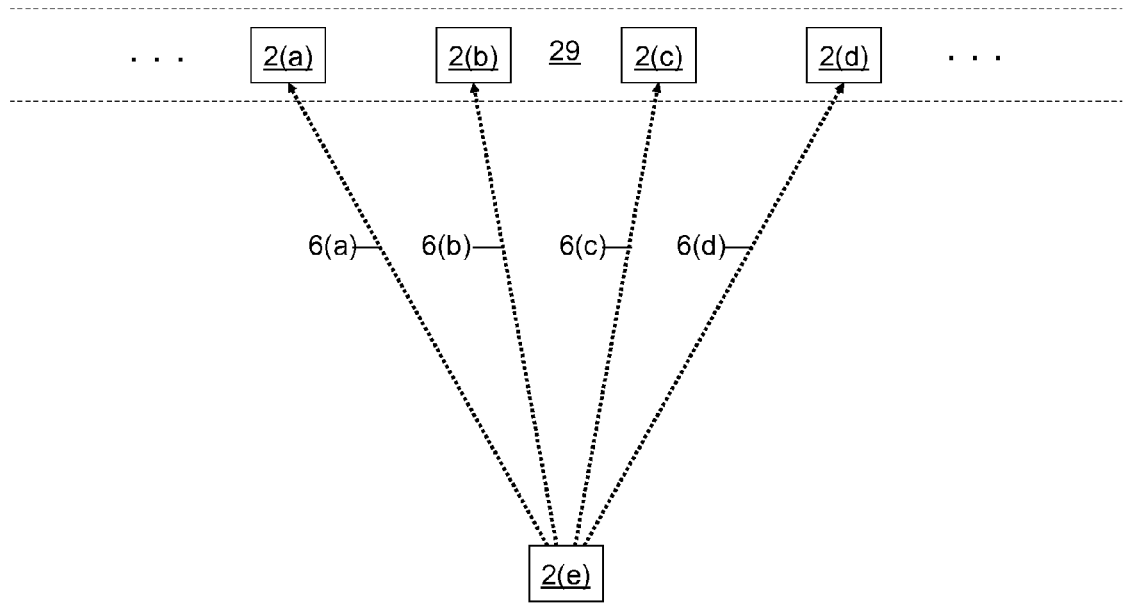
FIG. 2 presents how, in an embodiment of the invention, the remote routers reachable by the transparent network domain can be presented to any chosen one of the packet-switching nodes as organized in a row, with each element of such row representing one of the remote packet.

FIG. 2 presents how, in an embodiment of the invention, the remote routers 2 reachable by the network system 1 can be presented and appear to any chosen one of the routers as a row 29 of horizontally organized elements, wherein each element represents one of the next-hop upper-layer 19 nodes directly reachable through the network system 1. The network system 1 can provide packet-layer transparent connectivity to virtually any number of next-hop destinations for a router, such as the node 2(*e*), that has even just a single L1 connection to the network system 1. In FIG. 2, the remote routers of the set 2 are presented as they appear to the node 2(*e*) through the network system 1.

FIG. 3 presents, according to an embodiment of the invention, a data packet 39 with a simple forwarding label, called a forwarding instruction tag (FIT), inserted by a router in the packet overhead. In such a simple form, the FIT is a bit vector, called Forwarding Enable Vector (FEV) 30, wherein each one of its bits 31(*a*) through 31(*d*) is an explicit and individualized indication of whether the network domain should deliver the packet to the next-hop destination with a corresponding position within the next-hop destination presentation row 29. The same way as a network system 1 can deliver data packets among any number of routers 2, so can also the FEV contain any number of bits, even though in the example of FIG. 3 there are only four bits in the FEV 30. In a general sense, the FEV of a packet specifies to which one(s) of the next-hop destinations, when considered to be organized in a row 29, the network system is enabled to deliver the packet.

In the case of FIG. 2., i.e. for delivering packets 39 from the router 2(*e*) to the nodes 2(*a*), 2(*b*), 2(*c*) and 2(*d*) through network domain 1, the first bit 31(*a*) of the FEV 30 acts as the forwarding enable bit towards the first-from-left node 2(*a*) in the row 29, the second bit 31(*b*) towards the second-from-left node 2(*b*), the third bit 31(*c*) towards the third-from-left node 2(*c*), and the fourth bit 31(*d*) towards the fourth-from-left node 2(*d*) in the row 29. Thus, for instance, for the node 2(*e*) to get a packet delivered to nodes 2(*b*) and 2(*d*), it simply sets up the corresponding bits 31(*b*) and 31(*d*) in the FEV 30 of the packet, which will instruct the network system 1 to deliver the packet to its interfaces leading to the routers 2(*b*) and 2(*d*).

It is hereby seen that the simple forwarding method of the present invention, which uses a FEV 30 of the format as shown in FIG. 2 as the packet forwarding instruction, does not require using any forwarding instruction look-up tables or other type of switching or routing tables or content-addresses memories (CAMs) for packet forwarding decisions and for delivering packets to their right destinations of the set of next-hop destinations. Traditional packet-switching, such as conventional MPLS, ATM or Ethernet switching, requires resolving a pre-configured next-hop forwarding port and a new forwarding or link identifier, label, tag or L2 address for each forwarded packet, by using the incoming packet overhead as a search key to switching-tables. Such conventional packet-switching naturally requires implementing, pre-configuring and managing said packet switching-tables at each packet-switching point in the network, which of course is significantly more complicated and costlier than the explicit next-hop destination specific forwarding enable mechanism, i.e. the FEV 30, of the present invention. Thus, in a conventional packet-forwarding scheme, the router would need to specify the next-hop L3 destination of a packet, which it passes for a conventional inter-connect network using a L2 link identifier in the forwarding instruction of the packet, and the conventional interconnect network system would then resolve the route to the proper next-hop destination by looking up the next forwarding ports and link identifiers from switching-tables at each packet-switching point between the routers.

It is further seen that the forwarding method of the present invention, while significantly simpler than conventional packet forwarding methods, does however enable straightforward packet multi-casting, in addition to uni-casting, without the network implementational and management complexity associated with conventional multicast groups.

FIG. 4 presents an embodiment of an augmented format of an FIT 40, such that includes primary and alternative next-hop destination fields. Like the FIT format of FIG. 3, also this augmented FIT is inserted into a header of a packet 39 by the upper layer 19 packet-switching nodes 2 for them to instruct the network system 1 to deliver each packet to appropriate next-hop upper layer destination(s). In the embodiment of a FIT discussed herein in greater detail, the semantics of the sub-fields of the FIT 40 are as follows:

The sub-field 49, referred to as the Active Tag Identifiers (ATI), is used to mark whether its associated FIT entry is the active one within the stack of FITs for the next stage of forwarding the packet within a cluster 80 of network systems 1. More specifically, in an embodiment, the ATIs within the stack of one or more FITs in a packet header are used to activate one of the FIT entries in the packet header for a receiving packet forwarding instance, called a Forwarding Engine (FE), to use for it to determine a set of one or more next hop destination(s) for the packet. An FE in network system 1 according to the invention scans through the stack of FIT entries in the packet header, starting from the first i.e. top-most FIT, until it finds a FIT entry with its ATI bit 49 set to its active value, which in an embodiment discussed herein in more detail is logic '1'. The router 2 sending a packet to the network system 1 shall set the ATI bit to active value of logic '1' for the topmost of the set of FIT entries intended as forwarding instructions for the network system 1 between the routers 2, and to inactive value of logic '0' for the rest of the FITs intended for the network segment 1 between the neighboring routers 2. Unless a given packet forwarding stage within a network system 1 is configured, in an embodiment by an NMS for 1, as the final stage in the given network system 1, the FE will set to logic '1' the ATI bit in the (non-concatenation, see bit FC below) subsequent FIT next down in the stack, while setting the ATI bit of the FIT(s) that it itself used as forwarding instruction to logic '0'. The forwarding stage configured as the final stage within a network system 1 between the routers 2, i.e. an FE according to the invention forwarding a data packet to a router 2 (rather than next-stage network system 1) will set the ATI of the topmost FIT back to logic '1', as well as resets the ATI of the FIT that it used itself back to logic '0'. Thus, the stack of FITs 40 (as well as the rest of the contents) of packets delivered by a network system 1 or cluster of them (see FIG. 8) arrive to their destination routers 2 in their original values in which they were when first received by the (cluster of) network system(s) by their source routers 2.

Note also that, according to the embodiment of the invention discussed here in greater detail, the network system 1 does not add or remove any FITs (or any other bit fields) to or from the packet that it forwards between routers 2. Therefore, the network system 1 according to the invention performs FIT based data packet forwarding without altering any of the contents of the L2 packets 39 that it passes between the interconnected routers 2. The value of this feature includes that the, and that the capability for the destination routers to track the source routers of the packets delivered to them by (clusters 80 of) network systems 1 is improved, as the packets arrive to the destination routers as originally sent by the source routers.

The sub-field 48, referred to as the FIT concatenator (FC), is used to join certain bit fields in successive FIT entries, to form a single logical FIT entry (from two or more regular-length base FITs) with multiplied number of bits per the thus concatenated bitfields of such logical single FIT entry. In an embodiment, if the FC bit 48 is set to its active value (e.g. logic '1'), the FE using it shall append the FEV of the next FIT entry, called concatenation FIT, down the stack as upper i.e. more significant bits of the FEV 30 to be used for packet forwarding at that stage, as well as append the ID 41 and EADE 43 (see below) bit fields of the concatenation FIT, as upper bits to those bit fields in the present logical FIT entry. FEs within network system 1 are capable of ignoring bit fields other than FEV, ID and EADE of a concatenation FIT (i.e. an FIT following an FIT that had its FC bit set to its active state of logic '1'). In an embodiment, by setting the FC bit to logic '1' on multiple consecutive FITs, it is possible to concatenate multiple base FEV, ID and EADE entries to allow an unlimited number of next hop destinations per a forwarding stage, i.e., per a FE within a network system 1. In the discussed embodiment, the FC bits 48 of the FITs that are not concatenated with an preceding FIT (in the order from first to last, top to bottom of the stack of FITs) are left at their inactive value of logic '0'.

Figure 7:
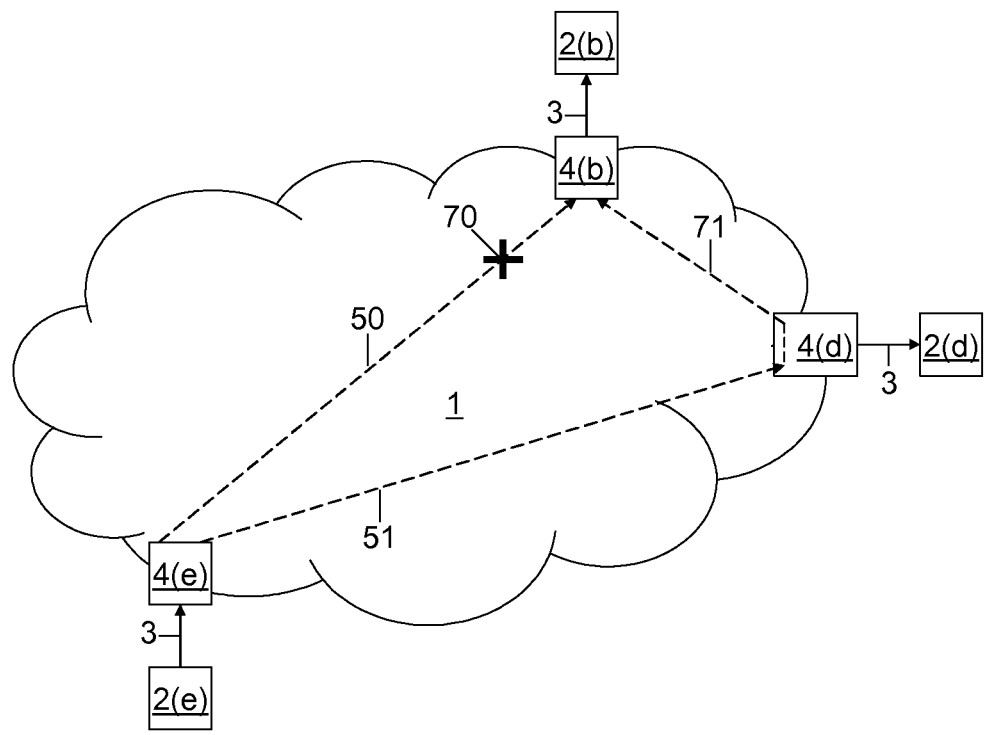
FIG. 7 presents a capability of the transparent network according to an embodiment of the invention to deliver a packet over an alternative route within the network domain to its primary next-hop destination during a failure or a congestion associated with the normally used shorter route to that destination, thereby using the available transmission bandwidth within the network domain as an optical buffer capacity.

The sub-field 41 is called a primary destination ID. It is used to carry the network domain 1 scope unique identifier of the primary next-hop upper-layer 19 destination node for the packet 39, or e.g. a multicast group or anycast packet type identifier. This field can be used in network testing, and also during normal operation, e.g. when a packet has to be routed across the network domain 1 to its next-hop packet-layer 19 destination via an intermediate packet forwarding point within the network domain 1, in which case the intermediate packet forwarding point(s) recognize from the sub-field 41 whether they need to re-forward the packet toward its primary destination, which operation is illustrated in FIG. 7. Certain values of this field can be reserved for special purposes. E.g., a pre-definable code, such as value 0, on this field can be used to indicate that the packet is an anycast packet.

The sub-field 30 is the FEV described above in association with the FIG. 3. For anycast packets, an embodiment of the network system 1 delivers the packet to such one of the reachable next-hop destinations of an anycast group indicated by the FEV that has an adequately low or the lowest level of traffic load.

The sub-field 43 is an Explicit Alternative Destination-Enable (EADE) indicator bit. In an embodiment, if that bit is not set to its active value, the network system 1 packet shall not forwarded the packet to an alternative destination but to the primary destination specified by FEV, unless the sub-field 44 is set to a value enabling default alternative destination forwarding, in which case the packet may be forwarded to a pre-definable default alternative destination when its primary destination is congested. In an embodiment, such a default alternative destination can be configured individually per each of the next-hop destinations reachable by the network domain 1. If EADE is set, the sub-field 44 specifies the alternative destination in case of a congestion or a failure associated with the route to the primary next-hop destination of the packet.

In sub-field 44, the alternative destination is identified by specifying the index number of its corresponding bit in the FEV 30. When EADE 43 is not set, a pre-definable code, such as binary "101", is used to enable default alternative destination forwarding.

It is worth noting that for up to eight next-hop destinations, and up to 64 unique primary destination ID field values, the FIT 40 of FIG. 4 can be presented in twenty bits, so that it fits into a single 20-bit Label field of the standard MPLS label stack entry form. That way, any 20-bit FIT 40 used as the destination specification part of the forwarding instruction for network system 1 can be treated as a regular MPLS Label by the routers 2. Moreover, the rest of the bit fields in a standard 32-bit MPLS label stack entry, i.e. its twelve least significant bits can also be used in a completely standard fashion when using network system 1 according to the invention to deliver MPLS packets among a group of MPLS routers 2. Naturally, the FIT 40 of FIG. 4 can also be shorter or longer than twenty bits, and in various embodiments it can be mapped to other packet protocol headers than that of MPLS, for instance to a 20-bit Flow Label field of an IPv6 packet, or to a 24-bit Frame Relay Logical Data Link Identifier field, or e.g. to Ethernet MAC frame VLAN tags.

The packet-layer transparent, forwarding look-up table free packet forwarding mechanism of the invention based on the pre-determined rules according to which the FEs of network system 1 forward packet directly based on their FITs 40 and the status of the routes to the set of destinations from each FE, though implementable using short and constant i.e. equal length FITs, provides a good scalability for virtually any number of routers to be transparently interconnected by the network 1 through its FIT stacking and concatenation mechanism. For instance, even with just a 1-byte-wide FEV 30 field, a stack of eight FITs allows providing a unique forwarding enable code to $8^8$ i.e. more than 16 million destination routers, while not requiring more than 8×4=32 bytes of forwarding instruction overhead in case of each FIT being mapped to a 4-byte forwarding label stack entry, and not requiring any packet-level routing, switching or forwarding table in the network system 1 according to the invention. Moreover, the FIT concatenation mechanism allows forwarding by a given FE to more than e.g. the eight destinations identifiable through the 8 bits of a 1-byte FEV of a base FIT entry. For instance, concatenating two FITs, each having a 1-byte FEV, provides forwarding enable bits in the concatenated FEV for sixteen next-hop destinations, and by stacking four such concatenated FEVs allows identifying $16^4=65536$ different egress interfaces 3 of such an embodiment of cluster of a network system 1, again without a need for any forwarding look-up tables in the transparent packet-forwarding network 1.

Naturally, in various embodiments of the invention, all or some of the benefits enabled by the forwarding method of the present invention may be achieved using a packet forwarding instruction that has the subfields of the FIT 40 in different order and/or in different formats than shown in FIG. 4, or that does not have all the sub-fields of FIG. 4, or that has additional sub-fields than those shown in FIG. 4.

Reference specifications for embodiments of FEs for an IF Unit (IFU) 4 of network system 1 are provided in the referenced patent applications [1], [3] and [4], in which specifications for network devices incorporating aspects of the IFU 4 and the invented forwarding method are referred to as the Adaptive-Concatenation Bus IF unit (ABI) or Intelligent Transport Network IF Module (IM).

Figure 5:
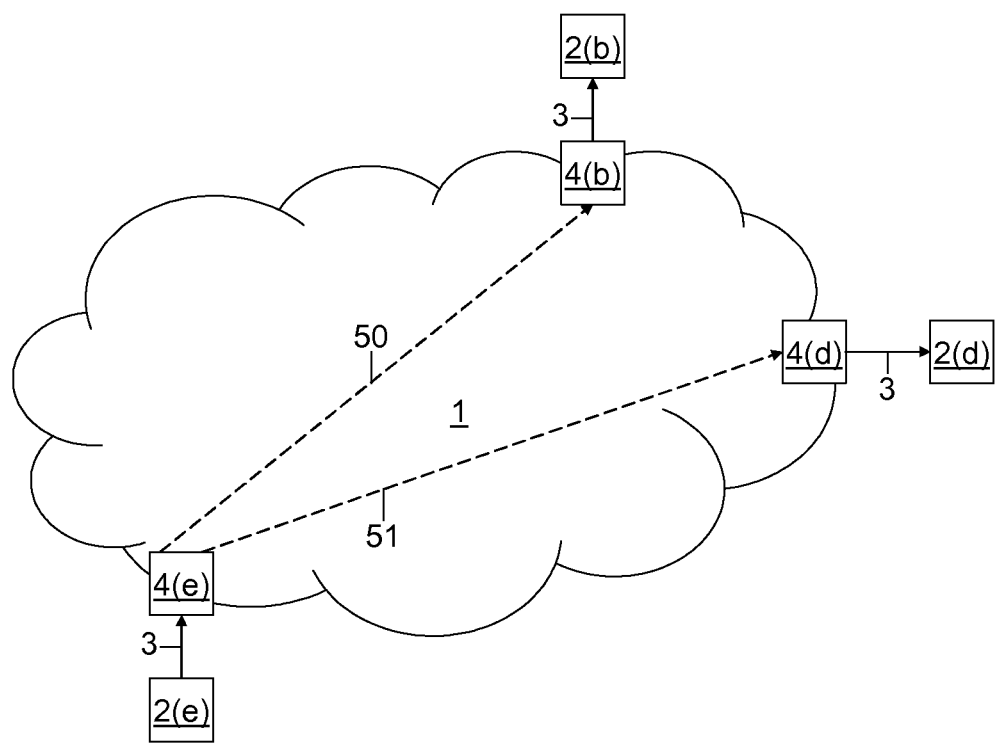
FIG. 5 presents a capability of the transparent network according to an embodiment of the invention to forward a packet to a better one of two alternative next-hop destinations indicated by the forwarding instruction of the packet.

FIG. 5 presents an example of the capability of the network domain 1 utilizing the present invention to forward a packet 39 to a preferable one of two alternative next-hop destinations, which in FIG. 5 are presented by routers 2(b) and 2(d), indicated by the forwarding instruction 40, or plain FEV 30, of the packet. In an embodiment, this traffic protection and route or server load balancing capability of network system 1 functions as follows:

Upon receiving a data packet 39 from a packet-layer 19 node, presented in FIG. 5 by node 2(e), the network system 1 IFU 4(e) on which the packet 39 arrived will determine the intended next-hop upper-layer 19 destination(s) for the packet based on the FIT 40 of the packet 39. If the FIT of the packet had an anycast indication, which in an embodiment of the invention, could be such as a value of 0 in the sub-field 41 of the FIT, those of next-hop destinations to which the FEV 30 enables forwarding the packet, form an anycast group for that packet. In FIG. 5, such anycast group is presented by nodes 2(b) and 2(d) in FIG. 5. The network system 1 will deliver an anycast packet to such at that time reachable next-hop destination of its anycast group that, at the moment the packet arrives on the network system 1, has the least level of traffic load or a sufficiently low level of traffic load on the network route leading to it.

The network system 1, according to an embodiment of the invention, determines the traffic load level on a route by monitoring the amount of data queued in a data buffer for future transmission on said route; the more data queued on the buffer the higher the traffic load level on its associated route. If the amount of data queued on such a data buffer is above a pre-definable threshold value, the route is considered to be under congestion. Examples of routes across an embodiment of network system 1 are the routes 50 and 51, connecting a source router 2(e) to destination routers 2(b) and 2(d) respectively.

The above described packet-level traffic protection and load-balancing method is done by the network system 1 according to an embodiment of the invention per each packet it receives from an upper-layer 19 node 2 for delivery to a next-hop upper-layer 19 destination, based on the prevailing route status, which an embodiment of the network system 1 monitors via continuously measuring the traffic load level and periodically checking the destination reachability for each route across it. In an embodiment, the reachability of the next-hop destinations is determined within the network system 1 based on periodic control-plane messaging such as described in the AMB Control Plane section of the Appendix A of the referenced patent application [4]. Therefore, the network system 1 is able to perform fast packet-level traffic-protection and maximize the network throughput via real-time load-balancing.

Figure 6:
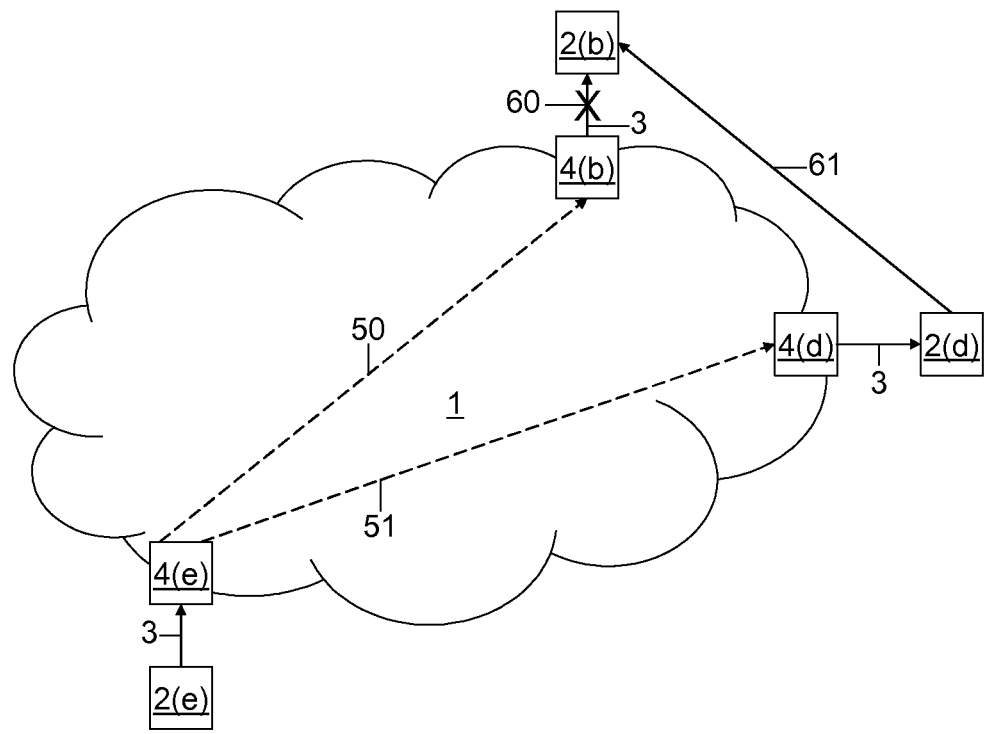
FIG. 6 presents a capability of the transparent network according to an embodiment of the invention to forward a packet over an alternative route to its primary next-hop destination during a failure or a congestion associated with the normally used shorter route to that destination.

FIG. 6 illustrates an example of the capability of the network system 1 utilizing the invention to forward a packet over an alternative route 61 to its primary next-hop destination 2(b) during a congestion or a failure 60 associated with the direct route 50 to that destination. This traffic protection and alternative routing capability of network system 1 is a variant of that presented in FIG. 5. FIG. 5 assumes that the two alternative next-hop destinations 2(b) and are of equal priority, and thus the packet should be forward to the less loaded one of them. In the case of FIG. 6, however, the route along the node 2(d) is longer, and thus in that case the node 2(b) is the primary and the node 2(d) an alternative next-hop destination, and therefore the network system 1 delivers a packet with such forwarding instructions 40 along the direct route 50 to its primary destination 2(b) whenever possible, and uses the alternative route 61, of which the route 51 to the intermediate destination 2(d) is a part of, only when the packet can not be delivered via its primary route. Thus, in this case, the direct route 50 to the primary next-hop destination 2(b) has a higher selection priority than the alternative route 61. The operation of the network system 1 according to an embodiment of the invention in this scenario is as follows:

Upon receiving a data packet 30 from a packet-layer 19 node, presented in FIG. 6 by node 2(e), the network system 1 IFU 4(e) on which the packet 30 arrived will determine the intended next-hop packet-layer 19 destination(s) for the packet based on the FIT 40 of the packet 39. If the sub-fields 43 and 44 of the FIT indicate that the packet may be forwarded to an alternative next-hop destination at the upper-layer 19, the network system 1 forwards the packet towards such an alternative destination, presented by node 2(d) in FIG. 5, along the alternative route 51, when the direct route 50 to the primary destination, presented by node 2(b) in FIG. 5, and indicated by the FEV 30 of the packet, is affected by a congestion or a failure 60; otherwise network system 1 forwards the packet to its primary destination 2(b) along the route 50.

The scenarios of FIGS. 5 and 6 are examples of the general packet-level traffic and real-time load-balancing capabilities of the invention, and it should be understood that both the anycast forwarding (per FIG. 5) and the prioritized alternative next-hop destination unicast forwarding schemes (per FIG. 6) can be used in each type of case, and in any variant thereof. For instance, in the case of FIG. 5, the alternative next-hop destinations 2(b) and 2(d) could be mutually prioritized, e.g. so that 2(b) has a higher selection priority, in which case the IFU 4(e) would forward a packet, whose FIT indicates that it should be delivered to either 2(b) or 2(d), to node 2(b) whenever possible.

FIG. 7 presents the capability of the network system 1 utilizing the present invention to deliver a packet over an alternative route 71 within the network domain 1 to its primary next-hop destination, presented by node 2(d) in FIG. 7, during a congestion or a failure 70 associated with the normally used shorter route 50 to that destination. The scenario in FIG. 7 is thus a variant of that of FIG. 6, with the difference that in the case of FIG. 7 the primary next-hop destination 2(b) of the packet is considered to be not reachable from the node 2(b) via any route outside of network system 1, and thus the network system 1 needs to complete alternative route from the intermediate forwarding point 4(d) to the primary next-hop destination 2(b) of the packet using its internal resources, even when the direct route 50, the route explicitly enabled by the FIT 40 (or FEV 30) of the packet, is not be usable. The operation of the network system 1 in such a case where the network system 1 has to dynamically detour-forward a packet to its next-hop destination using an internal alternative route 71, due to a congestion or failure along the network system internal part of the direct route 50 to its next-hop destination, is as follows:

Upon receiving a data packet 39 from a packet-layer 19 node, presented in FIG. 7 by node 2(e), the network system 1 IFU 4(e) on which the packet 39 arrived will determine the intended next-hop packet-layer 19 destination(s) for the packet based on the FIT 40 of the packet 39. If the sub-fields 43 and 44 of the FIT indicate that the packet may not be forwarded to a next-hop destination other than the only one (node 2(b) in FIG. 7) enabled by the FEV 30, the network system functions as follows:

Whenever the primary next-hop destination 2(b) is reachable via the direct route 50 indicated by the FIT, the network system 1 delivers the packet to its next-hop destination using that route.

If the direct route 50 to the indicated primary next-hop destination 2(*b*) is affected by a network system 1-internal congestion or failure 70, the network system 1 will deliver the packet to its primary next-hop destination 2(*b*) via an internal forwarding point 4(*d*) such that can re-forward the packet toward its primary next-hop destination 2(*b*). Such intermediate packet forwarding point 4(*d*) within the network domain 1 detects from the FIT 40 of the packet, in an embodiment of the invention at least in part based on its sub-field 41, that it needs to re-forward the packet toward its primary next-hop destination, rather than pass the packet on to its adjacent upper-layer 19 node, which in FIG. 7 is presented by node 2(*d*). The network system IFU 4(*d*) acting as an intermediate packet forwarding point will re-forward the packet based on its source IFU (4(*e*) in FIG. 7) and based on its primary destination ID, presented by the FIT sub-field 41, toward its primary next-hop destination 2(*b*) the same way the IFU 4(*e*) on which the packet arrived the network system 1, i.e., it will deliver the packet to the primary next-hop destination 2(*b*) along the shortest route from that location, i.e. route 71. It should be noted that by configuring the default alternative routes (such as route 71, from 4(*e*) via 4(*d*) to 4(*b*) in the case of FIG. 7) within the network domain 1 properly per each primary route (such as route 50 from 4(*e*) to 4(*b*) in FIG. 7), the intermediate packet re-forwarding points (such as 4(*d*) in FIG. 7) can resolve that a packet needs to be re-forwarded towards a particular primary next-hop destination (node 2(*b*) in FIG. 7) based even alone on a non-local value of the destination ID 41 of the packet and the direct L1 connection on which the packet arrived to that re-forwarding point, i.e., still without a need for a forwarding look-up table. Each re-forwarding point (such as 4(*d*) in FIG. 7) along the route of a packet across network domain 1 will decrement the Time-To-Live (TTL) figure of the packet by one, unless the TTL has reached value 1, at which point the packet is discarded to prevent a packet from looping around in the network domain endlessly.

In addition to providing fast packet-level traffic protection re-routing, the alternative routing capability of network system 1 presented in FIG. 7 also enables to use any currently available network fiber capacity as optical buffering capacity, thereby maximizing traffic burst tolerance while minimizing packet loss and electrical buffering capacity requirements within the network system 1. For instance, if the network system IFU 4(*e*), due to a congestion on the route 50, had no electrical buffering capacity available to store an additional packet in a queue for future delivery along the route 50 to node 2(*b*), it may forward the packet towards an intermediate packet forwarding point, such that whose associated buffer at the IFU 4(*e*) can accommodate an additional packet, to prevent packet loss. When the packet is being re-forwarded at the intermediate forwarding point, such as IFU 4(*e*) in FIG. 7, the congestion toward the packet next-hop destination 2(*b*) has likely (assuming the inter-router IF capacities are properly dimensioned) been reduced to a level at which that intermediate forwarding point has electrical data buffer space available to queue the packet for delivery towards the next-hop destination 2(*b*) of the packet.

A practical example of the scenario of FIG. 7, wherein a packet needs to be delivered to no other next-hop destination at the upper-layer 19 than the one explicitly indicated by its FIT is an Internet Exchange facility (IX) where Internet traffic is being passed between different operators' networks. In such case, a border router 2 of one of the network operators present at that IX specifies using a FIT 40 for the network system 1, through which the operators physically exchange traffic, to which one of the other service providers' border routers 2, which appear as organized in a row 29 when seen through any network ingress interface 3, each packet should be delivered. By using e.g. link-aggregated or otherwise protected point-to-point links 3 between the service providers border routers 2 and the network system 1, an efficient Internet Exchange facility, providing IP-transparent and end-to-end protected full-mesh connectivity is accomplished. It is thus seen that the novel forwarding scheme of network system 1 works both as an internal backbone solution within a single administrative network domain, as well as it works as a traffic exchange facility between different administrative domains.

FIG. 8 presents a clustered network system 80 containing multiple member network systems 1, wherein some of the interfaces 3, normally e.g. POS interfaces, of the member network systems 1 of the cluster 80 are interfaces between two different network systems 1, while others are interfaces between the network systems 1 and the upper-layer 19 nodes 2. A practical application of the type of hierarchical network architecture shown in FIG. 8 is an inter-city backbone network, wherein the directly meshed segments, among each member set 2 of routers, of the network cluster 80 represent intra-city metropolitan area networks 1 within the individual cities connected by the inter-city backbone. The transparent FIT stacking mechanism (using bit fields 49 of FITs per FIG. 4) of the invention per FIG. 8 is used so that in order to route a packet 39 across the cluster 80 of network systems 1, the source router 2 can configure a dedicated FIT 40, which could be mapped e.g. to an MPLS label stack entry (LSE), per each individual network system 1 along the intended path of the (MPLS) packet across the cluster 80 to its next-hop MPLS routing plane 19 destination node 2. An example of a possible route of a packet across the cluster 80 is presented in FIG. 8 by the route 81, which extends across three individual network systems 1 and thus can be specified with a stack of three network system 1 specific FITs 40 configured into the packet header. On the way across such cluster 80 of network systems 1, each network system 1 processes its own FIT per descriptions related to FIG. 4, so that the next network system 1 along the route will forward the packet based on its own FIT entry 40 configured specifically for that forwarding stage 1 within the cluster 80. The benefit of such extensible FIT forwarding scheme naturally is that it enables upper-layer-protocol transparent delivery of packets among unlimited number of upper-layer 19 nodes, with using short and fixed-length FITs, such as those presented in FIGS. 3 and 4, at the individual member network systems 1 of the cluster that interconnects the multitude of upper-layer 19 nodes. This in turn enables well scalable and fast packet forwarding over even very large packet-switched backbone networks. Finally, it should be understood that neither a single network system 1 nor a cluster 80 of network systems 1 has any limitations regarding its geographical scope. For instance, the network devices i.e. IFUs 4 of the member network systems 1 of a cluster 80 can be located anywhere in the world.

System Operation and Reference System Specifications

An embodiment of the present invention is described in the following first via a description its operating focusing on the novel characteristics of the network system 1. That is followed by detail system specifications for a practical system implementation.

An embodiment of a network system 1 per the invention delivers data packets among a set of router nodes 2. Such a network system comprises a set of external interfaces 3 for passing packets to and from the routers, and provides a set of routes 6, physically L1 connections between the network devices i.e. interface units 4 of the network system 1, for transparently delivering data packets 39 across the network system between the external interfaces. Due to packet-layer transparency, i.e. protocol transparency of the network system 1 at protocol layers of 2 and higher, the set of routers 2 interconnected through it are next-hop destinations to each others. The network system determines to which individual one or ones of the set of next-hop destinations it delivers a packet based in an embodiment discussed herein in greater detail on a set of one or more forwarding instructions 40 carried within the packet, and on a route status information of the routes leading to the set of next-hop destinations. The route status information considered by the FEs at IFUs 4 of network system when forwarding a packet includes the reachability of its next-hop destinations, and traffic load level on the routes to them, with the traffic load level being determined in an embodiment based on an amount of data queued on a buffer for a future transmission on the route. The network systems according to the invention further are able to do multi-stage packet forwarding packet-layer transparently, i.e., without modifying, adding or deleting any information fields of the L2 packets between source and destination routers 2, through to the use of a stack of forwarding instruction tags (FITs 40) per a packet, with one FIT per each stage of packet forwarding, and based on an active FIT entry identification mechanism allowing each forwarding stage to identify for the subsequent forwarding stage within a network system cluster 80 which FIT entry in the stack that stage to use, while reverting at the final stage of forwarding the stack of FITs to their original values in which they were when each packet was received by the network system 1 from its source router 2.

The invention provides a process for maximizing the network packet traffic throughput through a capability to dynamically select a preferable route from a set of alternative routes to deliver a packet to a proper next-hop destination node indicated by the packet forwarding instructions. The related process steps, according to an embodiment of the invention, comprise: i) receiving, by the network, sequences of data packets from the interconnected router via their associated interfaces; ii) monitoring, by a network interface on which a packet was received, a status of the set of individual alternative routes to deliver the packet, wherein the monitored status of a route includes a traffic load level on the route and reachability of the next-hop destination of the route, iii) selecting, by the network interface on which the packet was received from its source router, depending on the monitored status of the individual alternative routes, a suitable route of the set of alternative routes to deliver the packet; and iv) delivering the packet along the selected route across the network to its next-hop destination node. As discussed in the foregoing, the network utilizing the data throughput maximization per the invention is capable of delivering the data packet among the set of routers that said network interconnects without modifying any contents of the packets regardless of how many stages of the forwarding i.e. route selection process step any given packet goes through within the network between its source and destination routers.

The transparent forwarding look-up-table free packet forwarding method of the invention can naturally be applied in various applications, similar to or different from the communications network scenarios discussed in this specification.

General aspects of embodiments of invented packet forwarding method include that there are a set of ingress and egress ports to the packet forwarding network, and the network provides routes for delivering packets among a set of packet-switching nodes that interface with the network through its ingress and egress ports, and since packet forwarding network per the invention is packet-layer transparent, the set of packet-switching nodes reachable to each other via the routes across the network are next-hop destinations to each other even though the network per the invention does perform packet level switching. Moreover, the invented transparent packet forwarding method allows implementing packet forwarding networks such that do not need any packet-layer routing, switching or forwarding tables, enabled by the provided rules (see descriptions of the FIG:s, in particular FIG. 4, and Table 1), by which an embodiment of the network per the invention forwards the packets using a set of one or more forwarding instructions in the packet header directly to identify the intended next-hop forwarding destination for each packet. The invention thus avoids the need to look up the forwarding instructions for the packets based on their overhead fields, as is the case with conventional packet forwarding. The herein provided rules for transparent packet forwarding networks to interpret the packet forwarding overhead bitfields, called labels or tags, in order to carry out the forwarding decisions indicated by the routers inserting such labels into the packets, thus replace the need for the packet forwarding engines to store label-value specific forwarding instructions at their forwarding look-up-tables. This elimination of the need for packet-layer routing, switching or forwarding tables in networks utilizing the invention naturally results in significant cost-efficiency, network operations streamlining and network security benefits, as well as allows the administrator of the routers interconnected by a network per the invention to directly control packet forwarding across the network utilizing the invented forwarding method. Moreover, the elimination for the need for label swapping at the FEs according to the invention allows packet-layer transparent network connectivity among the routers interconnected, i.e., allows the routers 2 to interact with each others directly at all packet layer protocol levels.

According to an embodiment of invented method, the network determines whether to deliver a packet arrived on its ingress port to a particular egress port based at least in part on a set of one or more forwarding instructions included in the packet and on network status, with the network status including current reachability of one or more of the set of next-hop destinations, and current traffic load level on a route or routes across the network to one or more of the set of next-hop destinations. The invented packet forwarding method thereby is able to do dynamic protection and congestion avoidance re-forwarding and route load balancing based on the prevailing status of the routes to next-hop destinations, again automatically according to the herein provided forwarding rules, i.e. without requiring the n the routers that it interconnects to do dynamic adjustments to the forwarding labels provided for the packets to be delivered across the network utilizing to the invention.

Certain novel aspects of the invented transparent packet switching network are described below.

Transparency and Architectural Efficiency:

In an embodiment of the present invention, a network system 1 uses FITs 40 that are mapped to Label fields of MPLS Label Stack Entries (LSEs). Such an embodiment of the invention is able to deliver transparently, i.e. without modification, multi-protocol data packets among a set of packet-switching nodes, such as MPLS routers. Thus, the packet-switches such as MPLS routers interconnected will interface with each other over the network system 1 as if they were interconnected over direct inter-router point-to-point links, e.g. PPP links 6. However, using the network system 1 reduces the L1 port 3 count requirement by a rate of N:1 (N is an integer) for a routers that needs direct L2-transparent connectivity with N other routers, thereby substantially simplifying the network and improving the efficiency of network resource utilization. Moreover, since the invented packet forwarding techniques do not alter the contents of the data packets, the invention avoids the need for logic-intensive and delay-increasing function of packet frame checksum re-computations.

Fast Packet-Level Protection:

An embodiment of network system 1, when implemented over a fiber ring based physical topology, provides at least two alternative routes between any two network devices i.e. IF Units (IFUs) 4 of the network system, so that there is no single point of failure (NSPF) within the network system 1. The control plane of network system 1, such as the one described in Appendix A of the referenced patent application [4], periodically, e.g., once every SDH/SONET row period (which is the duration of ⅑ of the 0.125 ms frame period), exchanges network control and status information, which include reachability info of the IFUs 4 and the routers 2 interconnected by the network system 1, and based in part on which the network system 1 is able to route the packets across it to their correct next-hop destinations along the optimal working route. Thus, as the network system 1 provides fast (sub-50 ms) packet traffic protection re-routing in case of an internal failure (such as 70 in FIG. 7), an end-to-end NSPF-protected connectivity can be accomplished among the packet switching nodes 2 by using doubled, i.e., link-aggregated or 1:1 or 1+1 protected point-to-point links as the data interfaces 3 between the network system 1 and the set of packet-switching nodes 2 it interconnects.

The Chapter 3.2 of Appendix A of the referenced patent application [1] provides further discussions on traffic protection and fault recovery operation of an embodiment of network system 1.

Load Balancing and Global Network Throughput Maximization:

The internal L1 connections between the IFUs 4 within the network system 1 may be of different data rate than the point-to-point links 3 between the IFUs 4 and their adjacent packet-switching nodes 2. Thus, an IFU, which forwards packets that it receives over its ingress L1 interface 3 to the other IFUs of the network system 1 over the system 1 internal mesh of L1 connections, may over some period of time need to forward data toward a certain IFU of the network system 1 at a higher data rate than what is the capacity of the L1 connection to that IFU over that period of time. To prevent packets being lost in such cases, the IFU 4 provides a data buffer in which it is able to temporarily store i.e. queue packets for future transmission across the network system to a destination IFU associated with the buffer. However, if a router 2 transmits data to another router over the network system 1 persistently at a rate exceeding the data rate of the corresponding network system-internal L1 connection, the data buffer will fill up. To prevent the buffer from overflowing and packet getting lost even in such cases, the network system 1 will redirect a packet that would normally be forwarded to such an overloaded route, whose associated buffer fill is above a pre-definable threshold level, to another IFU within the network system through which the next-hop destination can be reached over a non-congested, albeit longer, route. Such an alternative route, when necessary due to a failure or a congestion associated with the primary route, is determined by an embodiment of a forwarding engine according to the invention based on the FIT 40 of each packet 39 and the fill-level of the data buffers associated with each system internal L1 connection i.e. route originating from the IFU 4 making the forwarding decision. The destination IFU of such an alternative route in turn re-forwards such packets arriving to it over the network system 1 whose FIT indicates that the packet is not primarily destined to its adjacent router 2 either towards the IFU adjacent to the primary next-hop destination of the packet or to its own adjacent router, depending on the FIT of the packet, and on the current traffic load and reachability status of the route from that IFU to the primary next-hop destination. Reference specifications for both the congestion avoidance and failure rerouting scheme for an embodiment of a network system incorporating aspects of the invention are disclosed in the referenced patent [2].

Route Optimization and Delay Minimization:

The above described dynamic capability of the invention to use an alternative route across the network to reach either an alternative next-hop destination, or to reach the primary next-hop destination using an alternative route, which usually involves at least one intermediate IFU 4 i.e. an intermediate packet forwarding point, is intended to maximize the global throughput of packet traffic across the network. According to the invention, this network data throughput maximization is achieved via routing traffic using network routes that have sufficiently bandwidth available to deliver given data packets between the network ingress and egress points. Such route optimization process also reduces the packet loss rate and queuing delay that the data packets experience at packet forwarding points due to the fact that the IFUs 4 of the network system 1 are able to dynamically select the least loaded one of the alternative routes, based on the amount of data queued in the data buffers associated with alternative routes across the network system. I.e., when alternative routing i.e. load-balancing is enabled for a certain packet, as indicated through its FIT, e.g. as per Table 1 (see bit 7 of byte 2), the IFU 4 on which it arrives over its ingress L1 connection 3 will forward such packet along a route whose associated buffer fill is below a pre-definable congestion threshold, whenever possible.

Moreover, in an embodiment of the invention, the herein described dynamic route optimization method is combined with the dynamic L1 bandwidth allocation optimization among the L1 connections between the IFUs 4 of a network system according to the referenced patent applications [5] and [6].

Use of Unutilized Network Fiber Transport Bandwidth as Optical Buffering Capacity:

When the above described real-time traffic-load-adaptive route optimization process involves delivering a packet to its next-hop destination across network system 1 along an alternative route, via an intermediate IFU 4, for the purpose of avoiding a congestion on the normally used direct route and preventing packet loss due to a buffer overflow, the network system 1 can be said to use the network bandwidth among the IFUs as optical buffering capacity, as a more cost-efficient and scalable alternative to using only conventional electrical buffering capacity, such as RAM chips, at the IFUs. In addition to such novel optical buffering method, the network system 1, with its capability to route a packet to its primary next-hop destination via intermediate IFUs using under-utilized routes in case the direct route to the primary next-hop destination is over-loaded, is able to utilize also the available electrical buffering capacity at intermediate IFUs along the alternative route, thus accomplishing a novel well scalable distributed buffering scheme. With such novel optical and distributed buffering techniques, a packet forwarding node, such as an IFU 4, rather than trying to electrically buffer the packets in RAMs until the congestion clears, will forward a packet that had been primarily destined to a congested route, using an alternative non-congested route, to a suitable other IFU in the network domain 1 that, at a later time by when the congestion is likely to be over, can re-forward the packet to the link it is destined to.

In addition to overall minimizing the need for electrical buffering capacity, and thereby optimizing the performance as well as the implementational efficiency of packet-switching networks, it is worth to note that these novel route optimization and associated optical and distributed buffering schemes of the present invention enable to achieve an optimal network throughput with using electrical data buffers at IFUs 4 that are just deep enough to monitor the traffic load level on their associated routes, instead of using electrical data buffers that would be large enough to be able to physically store an equal amount of data as a fiber connection between two nodes in a wide area network. Note also that a 50 Mbps STS-1 connection (the basic SONET signal data rate) can store approximately $[10^{-3}\ m/(2.5 \times 10^{-8}\ m/s)] \times 5 \times 10^7\ b/s = 200$ bits per a kilometer of the fiber span between two nodes. For instance, an STS-192 connection on a 100 km fiber can be used to store approximately 3.84 Mb of data. Thus the novel capability of the present invention to dynamically use available network bandwidth on non-congested routes as optical buffering capacity and to utilize the available electrical buffering capacity at the IFUs 4 along the non-congested alternative routes provides enough effective data buffering capacity per each route across the network system 1 among the routers 2 it interconnects so that the IFUs only need such an amount of electrical buffering capacity that enables them to monitor the traffic load level on the routes originating from it. Such amounts of electrical buffering capacity can be implemented with high-throughput on-chip RAMs, thus eliminating the need to use larger, low-throughput off-chip RAMs within the network system 1. The novel real-time traffic-load-adaptive route optimization capability and the associated network-scope distributed and optical data buffering methods of the network system 1 according to the invention, thus enable cost-efficiently supporting higher network interface 3 data rates, in addition to optimizing network throughput and performance.

System Specifications

The Appendix A, and in particular the data plane discussion in its section 3.3, of the referenced provisional patent application [1] provides reference system engineering specifications for a practical implementation of a transparent packet forwarding network utilizing aspects of the present invention. A mapping between acronyms used in the referenced patent application [1] and the more general terms and acronyms used in this specifications is provided below:

ABI IFU; a network device, reference character 4
AMB L1 connection between IFUs, a route across a network system 1
A-M Network system 1 configured to provide meshed connectivity among the set of packet-switching nodes 2 that it interconnects The system specifications in referenced provisional patent application [1] relate to an application of an embodiment of the invention in an environment where the network system 1, called A-M or another assembly of AMBs, delivers MPLS packets among MPLS Label Edge Routers (LERs) or switches. While the Appendix A of the referenced provisional application [1] provides systems engineering specifications for a particular practical implementation of elements of the present invention, the MPLS forwarding related chapters of the specifications are rewritten in the following in a more general form:

Interconnect of MPLS Routers or Switches Using Network System 1:

For MPLS traffic, the network system 1 is completely L2 (and above) protocol transparent; it does not modify the L2 (or higher level protocol) packet headers. For the purpose of interconnection of MPLS routers of switches (both called collectively as routers) over a network system 1, the routers 2 thus can operate as if they were directly connected to each other over L2-transparent inter-switch PPP links 6, with a difference that in the case of network system 1 based interconnect, the per-destination-router dedicated inter-router L1 ports of the routers are replaced by a shared stat-muxed L1 port 3 between each router 2 and its adjacent IFU 4 of network system 1. The mesh of dedicated inter-switch PPP links are mapped in an embodiment of a network system 1 to a mesh of adaptive-bandwidth, direct L1 connections between its IFUs 4. (For adaptive-bandwidth L1 connections, please refer to [5] and [6].) Thus, in case of network system 1 interconnecting a group 2 of routers, each router of the group can transmit all its packets to the other routers in the group over a shared (optionally protected) stat-muxed L1 connection 3 between the router and its adjacent IFU, instead of transmitting the packets on one (or more) of the destination-router-dedicated PPP/L1 ports that would be required in a conventional, non-adaptive physical layer mesh based network architecture.

Ingress Packet Forwarding:

For each MPLS packet 39 that an router 2 passes for delivery over the network system 1, the router selects the next-hop router(s) for the packet by configuring a forwarding instruction 40 (or plain FEV 30), which includes a next-hop destination router selection code, i.e. the FEV-field, in the Label field of the top MPLS LSEs of the packets.

Thus, by using a network system 1 for delivering packets 39 among N (an integer) routers 2, the conventional architecture of having each router to exchange packets with the other routers over N instance of per-destination-router dedicated inter-router L1 connections is replaced by having each router transmit all its packets over a shared stat-muxed L1 connection 3 to its adjacent IFU 4 and instructing, by inserting a FIT 40 into the top-most MPLS Label, the IFU 4 to forward each packet to the appropriate next-hop destination router(s).

As an example, we here consider a case where an router needs direct L2-transparent connectivity to a set of eight other routers 2. Using dedicated inter-switch L1 connection, the router would need eight L1 ports 3, one per each of the eight directly reachable routers. Logically, these L1 ports and the next-hop routers associated with them appear to their host router as if arranged in a row 29 from left to right. Using network system 1 for interconnecting the nine routers, each one of the nine routers can exchange packets with all of its eight L2-transparently reachable i.e. direct-neighbor routers over a shared stat-muxed L1 connection 3 to its adjacent IFU 4, and specifies (for the IFU) the next-hop destination router(s) of each packet by configuring one or more FITs 40 for the packet. A FIT is configured according to an embodiment of the invention by setting up bit(s) in the FEV-field 30 of the top MPLS Label of the packet 39, with each set bit corresponding to the location(s) of the next-hop destination router(s) in the row 29 as which they appear to the router passing the packet to the network system 1.

The sub-fields of a FIT 40 and their semantics, mapped to an MPLS Label Stack Entry (LSE) bit fields according to an embodiment of the invention, are provided as an example in the below Table 1:

TABLE 1

The semantics and bit encoding of the sub-fields in FITs 40 for use in a
network system 1 in an MPLS-switch 2 interconnect application, according to an embodiment
of the invention. The 20-bit FIT can be mapped for instance into a single MPLS Label field.
The remainder of the MPLS LSE bits can be used per the applicable MPLS standards.

| MPLS Label byte/bits | Field name | Semantics |
|---|---|---|
| Byte 0, bit 7 | Active FIT Identifier (ATI) 49 | Used to mark the present LSE (i.e. a FIT or a concatenation thereof) as either active or inactive for the stage of forwarding within a network system cluster 80 receiving the FIT. An IFE or EFE in an A-M network scans through the MPLS label stack, starting from the top-most label, until it finds an LSE with its ATI bit set to logic '1'. The MPLS router sending a packet to A-M shall set this bit to the active state of '1' exclusively for the first i.e. topmost of the LSEs intended as forwarding instructions for the A-M segment, and to the inactive state of '0' for the rest of the LSEs intended as FITs for the A-M segment between the neighboring MPLS routers. Unless a given A-M forwarding stage is configured (by NMS) as the final stage in an A-M network, the EFE will set to '1' the ATI bit in the subsequent (non-concatenation, see bit FC below) LSE next down in the stack, while setting the ATIs of the LSE that it itself used as forwarding instruction to '0'. The A-M forwarding stage configured as the final stage in an A-M segment between MPLS routers, i.e. an A-M forwarding engine interfacing on its egress access interface with an MPLS router (rather than next-stage A-M network) will set the ATI of the topmost LSE back to '1', as well as resets the ATI of the LSE that it used itself back to '0', resulting in that the destination router 2 to which the A-M 1 (cluster) delivered the packet receives the stack of LSEs used as FITs for the A-Ms in their original values in which the FITs were when first received by the A-M (cluster) from the source router 2 sending the packet to the (cluster 80 of) A-Ms 1.<br>Note also that A-M does not add (push) or remove (pop) any LSEs. Thus A-M performs MPLS Label based packet forwarding without altering any of the contents of the L2 packets that it passes between the interconnected routers. |
| Byte 0, bit 6 | FIT concatenator (FC) 48 | If set to '1', the IFE and EFE shall append the FEV of the next LSE entry, called concatenation LSE, down the stack as upper i.e. more significant bits of the FEV 30 (see below) to be used for packet forwarding at this stage, as well as append the ID and EADE (see below) bit fields of the concatenation LSE, as upper bits to those bit fields in the present LSE. For instance, the FEV 30 of the $4^{th}$ LSE in a series of concatenated LSEs become the bits [31:24] of the concatenated FEV, assuming the FEV in each FIT entry is 8 bits. All other bit fields than FEV, ID and EADE of concatenation LSE (i.e. an LSE following an LSE that had its FC bit set to '1') shall be ignorable. By setting the FC bit to '1' on multiple consecutive LSEs, it is possible to concatenate multiple base FEV, ID and EADE entries to allow an unlimited number of next-hop destinations per a forwarding stage at A-M. |
| Byte 0, bits 5:0 | Destination ID# (DI) 41 | The A-M scope ID of the primary destination MPLS router (or a multicast group ID). Value '0' causes the packet to be treated as an anycast packet. The EFE makes packet re-forwarding decisions, in cases of multicast, load-balancing and protection re-routing, based on this field and EADE (see below). |
| Byte 1, bits 7:0 | Forwarding Enable Vector (FEV) 30 | Unicast and multicast packets:<br>If bit n (=0 . . . 7) is set, the packet is to be forwarded to the FIFO #n buffering data to the nth-from-left next-hop MPLS router as seen by the MPLS router setting the Label (as well as by the IFU forwarding the packet).<br>Anycast packets:<br>Out of the AMBs, whose associated bit in the FEV was set, the packet is forwarded to the one whose associated ABM FIFO had the lowest fill level.<br>See FIG. A-3-3-2-1 in Appendix A of [1] for hardware implementation reference of forwarding packets based on a FEV. |
| Byte 2, bit 7 | Explicit Alternative Destination Enable (EADE) 43 | If not set, the packet may not be forwarded to an alternative destination but the one specified by FEV, unless the BDN (see below) is set to binary value "101", in which case the packet may be forwarded to the SW configured default backup destination (specific to its primary destination ABI) when its primary destination is under redirect request. Redirect request for a given AMB and its destination is declared when the fill level of an associated ABM FIFO is above a specified threshold, or when the AMB in question is under a L1 defect, or when the software has disabled forwarding packets on a given AMB. The default backup destination ABI is normally the same as the protection ABI/AMB for the primary destination ABI. (The protection ABIs are configured per the ABMs.)<br>If set, the below bits specify the secondary destination in case of redirect request associated with its primary destination ABI. |

TABLE 1-continued

The semantics and bit encoding of the sub-fields in FITs 40 for use in a network system 1 in an MPLS-switch 2 interconnect application, according to an embodiment of the invention. The 20-bit FIT can be mapped for instance into a single MPLS Label field. The remainder of the MPLS LSE bits can be used per the applicable MPLS standards.

| MPLS Label byte/bits | Field name | Semantics |
|---|---|---|
| Byte 2, bits 6:4 | Backup Destination Number (BDN) 44 | The # (0 ... 7) of the backup AMB to which the packet is to be forwarded if its primary ABM FIFO (as specified by FEV) has a redirect request. |

Egress Packet Forwarding:

Egress packet forwarding function is equal to the ingress packet forwarding described above; the packets routed across the network domain 1 to a destination IFU 4 within the network system 1 are forwarded, based on their FITs and their source IFU, either to the egress access IF 3 of the destination IFU in case destination ID 41 of a given packet matched the value configured as the local ID for the IFU, or otherwise, to L1 connections (AMBs per [4]) from that IFU to remote IFUs of the network system 1, in an embodiment based on the L1 connection on which such a packet arrived at such an intermediate IFU.

MPLS Forwarding within Clustered Network Systems:

IFUs 4 of network systems 1 are able to interface over their access interfaces 3 with IFUs 4 of other network systems 1 the same way as the IFUs interface with routers 2. The ATI based active FIT identification mechanism (per descriptions regarding FIG. 4 and Table 1) of the invention allows the routers interconnected by a cluster 80 of network systems 1 to specify an intended route of a packet across the clustered network system by configuring a dedicated FIT 40 for each stage network systems 1 along the intended route of the packet across such cluster of network systems 1, and inserting the network system 1 specific FITs in the Label fields of the appropriate MPLS LSEs.

CONCLUSIONS

This detailed description is a specification of embodiments of the present invention for application examples and illustrative network operation scenarios discussed in the foregoing. Specific application, architectural and logic implementation examples are provided in this and the referenced patent applications for the purpose illustrating a practical implementation of the invented concepts. Naturally, there are multiple alternative ways to implement or utilize, in whole or in part, the principles of the invention as set forth in the foregoing.

For instance, in various embodiments, the steps associated with delivering packets through networks according to the invention can be performed in different orders than what is described in the examples herein, as well as can be combined together or with other steps, functions or techniques. For example, whereas in the examples described herein, a given step that is indicated as performed by an egress forwarding engine, in other embodiments can be performed by an ingress forwarding engine, or vice versa, and furthermore, while the ingress and egress forwarding engine modules are herein described as their own functional entities, in alternative embodiments, these forwarding functions can be combined with other functional modules, or be divided further into sub-modules, and so forth. Accordingly, in various views of the invented systems and methods, the ingress and egress stages of forwarding processing at a given network system can be considered as forming one logical stage of forwarding, whereas in alternative views these stages can be considered as independent, or further still as part of other functionality.

Generally, those skilled in the art will be able to develop different versions and various modifications of the described embodiments, which, although not necessarily each explicitly described herein individually, utilize the principles of the present invention, and are thus included within its spirit and scope. It is thus intended that the specification and examples be considered not in a restrictive sense, but as exemplary only, with a true scope of the invention being indicated by the following claims.

What is claimed is:

1. A method for delivering data packets over a network, the method comprising:
receiving a data packet, the data packet including a stack of two or more forwarding instruction tags (FITs) and a set of active tag identifiers (ATIs), wherein the set of ATIs indicate one of the FITs in the stack as an active FIT to be used at a next stage of forwarding;
scanning the stack of FITs until a FIT indicated by the ATIs as the active FIT is found, wherein, if it is determined that the topmost FIT is not the active FIT, said scanning continues through one or more subsequent FITs in the stack; determining a next hop destination corresponding to the active FIT; modifying the ATIs to indicate a subsequent active FIT, if any, in the stack; and forwarding the data packet to the determined next hop destination.

2. The method of claim 1, wherein:
each FIT comprises an ATI, with one of the FITs having its ATI set to an active value while the other FITs have their ATIs set to inactive values, and
the FIT with its ATI set to the active value is taken as the active FIT.

3. The method of claim 1, wherein each FIT is of constant length in bits.

4. The method of claim 1, wherein the FITs comprise information fields whose contents indicate whether a given set of FITs are concatenated, to form one logical FIT entry.

5. The method of claim 1, wherein at least one of the FITs includes an indication of to which one or ones of a set of next-hop destinations the packet is intended to be forwarded.

6. The method of claim 1, wherein at least one of the FITs includes an individualized indication per at least one next-hop destination of whether the packet is intended to be forwarded to that destination.

7. The method of claim 1, further comprising:
at a final stage of forwarding, reverting the ATIs of the packet to their original values in which they were when the packet was first received by the network.

8. The method of claim 7, wherein at the final forwarding stage, the ATIs are reverted to their original values by marking as active the first FIT and as inactive the other FITs in the stack.

9. A network system for delivering data packets, wherein one or more of the data packets has a header including a stack of two or more forwarding instruction tags (FITs) and a set of active tag identifiers (ATIs) that mark one of the FITs as an active FIT, the network system comprising:
- a set of network devices,
- scanning the stack of FITs until a FIT indicated by the ATIs as the active FIT is found, wherein, if it is determined that the topmost FIT is not the active FIT, said scanning continues through one or more subsequent FITs in the stack;
- at least at one of the network devices, hardware logic at a forwarding engine configured to i) forward a packet received over an external interface based at least in part on the active FIT, and ii) modify the ATIs to mark as active a subsequent FIT for a subsequent stage of forwarding in the network system, if any such stage exists.

10. The network system of claim 9, wherein:
- each FIT comprises an ATI, with one of the FITs having its ATI set to an active value while the other FITs have their ATIs set to inactive values, and
- the FIT with its ATI set to the active value is taken as the active FIT.

11. The network system of claim 9, wherein each FIT is of equal length in bits.

12. The network system of claim 9, wherein the FITs comprise information fields whose contents indicate whether a given set of FITs are concatenated, to form one logical FIT entry.

13. The network system of claim 9, wherein at least one of the FITs includes an indication of to which one or ones of a set of next-hop destinations the packet is intended to be forwarded.

14. The network system of claim 9, wherein at least one of the FITs includes an individualized indication per at least one next-hop destination of whether the packet is intended to be forwarded to that destination.

15. The network system of claim 9 further comprising:
- at least at one of the network devices, an egress forwarding engine that, if configured as functioning as a final stage of forwarding in the network system, reverts the ATIs of the packet to their original values in which they were when the packet was first received by the network system.

16. The network system of claim 15, wherein the egress forwarding engine reverts the ATIs of the packet to their original values by marking as active the first FIT and as inactivate the other FITs.

17. A network device for forwarding data packets, wherein one or more of the data packets has a header including a stack of two or more forwarding instruction tags (FITs) and a set of active tag identifiers (ATIs) that mark one of the FITs as an active FIT, the network device providing: at least one access interface, a set of one or more connections, each transporting data packets to its corresponding destination network device, hardware logic at a forwarding engine configured to i) scan the stack of FITs until a FIT indicated by the ATIs as the active FIT is found, so that, if it is determined that the topmost FIT is not the active FIT, such scanning continues through one or more subsequent FITs in the stack, ii) forward a packet received over an access interface to a destination network device over its corresponding connection, based at least in part on the active FIT, and iii) unless configured otherwise, modify the ATIs to mark as active a subsequent FIT in the packet header.

18. The network device of claim 17, wherein:
- each FIT comprises an ATI, with one of the FITs having its ATI set to an active value while the other FITs have their ATIs set to inactive values, and
- the FIT with its ATI set to the active value is taken as the active FIT.

19. The network device of claim 17, wherein all the FITs are of equal length in bits.

20. The network device of claim 17, wherein the FITs comprise information fields whose contents indicate whether a given set of FITs are concatenated, to form one logical FIT entry.

21. The network device of claim 17, wherein at least one of the FITs includes an indication of to which one or ones of a set of next-hop destinations the packet is intended to be forwarded.

22. The network device of claim 17, wherein at least one of the FITs includes an individualized indication per at least one next-hop destination of whether the packet is intended to be forwarded to that destination.

23. The network device of claim 17 further comprising:
- an egress forwarding engine that, if configured as functioning as a final stage of forwarding in the network system, reverts the ATIs of the packet to their original values in which they were when the packet was first received by the network system.

24. A method for delivering data packets over a network, the method comprising:
- sending a data packet to a network comprising a plurality of network devices, the data packet including a stack of two or more forwarding instruction tags (FITs) and a set of active tag indicators (ATIs), wherein the set of ATIs indicate one of the FITs in the stack as an active FIT to be used at a next stage of forwarding;
- at each of a set of the network devices, receiving the data packet, scanning the stack of FITs until a FIT indicated by the ATIs as the active FIT is found, wherein, if it is determined that the topmost FIT is not the active FIT, said scanning continues through one or more subsequent FITs in the stack, determining a next hop destination corresponding to the active FIT, modifying the ATIs to activate a subsequent FIT, if any, in the stack, and forwarding the data packet to the determined next hop destination;
- at one of the network devices at a final stage of forwarding the data packet in the network,
- reverting the ATIs of the packet to their original values in which they were when the packet was first received by the network.

25. A network device for delivering data packets over a network, the device configured with at least one hardware or software instruction for causing the device to perform a method comprising:
- receiving a data packet, the data packet including a stack of two or more forwarding instruction tags (FITs) and a set of active tag indicators (ATIs), wherein the set of ATIs indicate one of the FITs in the stack as an active FIT to be used at a next stage of forwarding scanning the stack of FITs until a FIT indicated by the ATIs as the active FIT is found, wherein, if it is determined that the topmost FIT is not the active FIT, said scanning continues through one or more subsequent FITs in the stack; determining a next hop destination corresponding to the active FIT; modifying the ATIs to activate a subsequent FIT, if any, in the stack; and forwarding the data packet to the determined next hop destination.

26. The method of claim 24, wherein:

each FIT comprises an ATI, with one of the FITs having its ATI set to an active value while the other FITs have their ATIs set to inactive values, and the FIT with its ATI set to the active value is taken as the active FIT.

27. The device of claim 25, wherein:

each FIT comprises an ATI, with one of the FITs having its ATI set to an active value while the other FITs have their ATIs set to inactive values, and the FIT with its ATI set to the active value is taken as the active FIT.

* * * * *

UNITED STATES PATENT AND TRADEMARK OFFICE
CERTIFICATE OF CORRECTION

| | | |
|---|---|---|
| PATENT NO. | : 8,619,769 B2 | Page 1 of 1 |
| APPLICATION NO. | : 12/390387 | |
| DATED | : December 31, 2013 | |
| INVENTOR(S) | : Mark Henrik Sandstrom | |

It is certified that error appears in the above-identified patent and that said Letters Patent is hereby corrected as shown below:

In the Specification:

In Column 4, Line 47, delete "the those" and insert -- those --, therefor.

In Column 5, Line 39, delete "FIG. 2.," and insert -- FIG. 2, --, therefor.

In Column 8, Line 59, delete "subfields of" and insert -- sub-fields of --, therefor.

In the Claims:

In Column 24, Line 35, in Claim 24, delete "active tag indicators (ATIs)," and insert -- active tag identifiers (ATIs), --, therefor.

In Column 24, Line 59, in Claim 25, delete "active tag indicators (ATIs)," and insert -- active tag identifiers (ATIs), --, therefor.

Signed and Sealed this
Eighth Day of July, 2014

Michelle K. Lee
*Deputy Director of the United States Patent and Trademark Office*